(12) United States Patent
Kang

(10) Patent No.: US 10,593,096 B2
(45) Date of Patent: Mar. 17, 2020

(54) GRAPHICS PROCESSING EMPLOYING CUBE MAP TEXTURING

(71) Applicant: SAMSUNG ELECTRONICS CO., LTD., Suwon-si, Gyeonggi-Do (KR)

(72) Inventor: Seok Kang, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 30 days.

(21) Appl. No.: 15/794,202

(22) Filed: Oct. 26, 2017

(65) Prior Publication Data

US 2018/0174352 A1    Jun. 21, 2018

(30) Foreign Application Priority Data

Dec. 20, 2016    (KR) .................. 10-2016-0174769

(51) Int. Cl.
*G06T 15/04*    (2011.01)
*G06T 15/00*    (2011.01)

(52) U.S. Cl.
CPC ............ *G06T 15/04* (2013.01); *G06T 15/005* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,975,319 B1 | 12/2005 | Donovan et al. | |
| 7,450,124 B2 | 11/2008 | Burch et al. | |
| 7,595,806 B1 | 9/2009 | Toksvig et al. | |
| 8,624,896 B2 | 1/2014 | Sakamoto et al. | |
| 9,367,948 B2 | 6/2016 | Peng et al. | |
| 9,460,552 B2 | 10/2016 | Akenine-Moller et al. | |
| 2005/0017983 A1* | 1/2005 | Liao .................. G06T 15/04 | |
| | | | 345/582 |
| 2015/0017983 A1 | 1/2015 | Cho et al. | |

FOREIGN PATENT DOCUMENTS

| | | |
|---|---|---|
| JP | 2006244426 | 9/2006 |
| JP | 4584956 | 11/2010 |
| JP | 4900051 | 3/2012 |
| KR | 1020060101223 | 9/2006 |
| KR | 100897006 | 5/2009 |
| KR | 100951121 | 3/2010 |
| KR | 1020120001114 | 1/2012 |
| KR | 1020140103374 | 8/2014 |

OTHER PUBLICATIONS

Vulkan 1.0.24 0—A Specification.
European Search Report dated Mar. 12, 2018 in corresponding European Patent Application No. 17206725.8. (10 pages).
European Search Report dated Mar. 18, 2018 in corresponding European Patent Application No. 17206725.8. (10 pages).

* cited by examiner

*Primary Examiner* — Zhengxi Liu
(74) *Attorney, Agent, or Firm* — F. Chau & Associates, LLC

(57) ABSTRACT

Provided are a method and an apparatus for transforming coordinates of pixels representing boundary points of an object on a cube map, when pixels respectively correspond to different faces of a cube map. Distances between the boundary pixels may be calculated by using the transformed coordinates. Based on the on the calculated distances, a level of detail (LOD) for texturing the cube map of the pixels may be determined.

12 Claims, 11 Drawing Sheets

FIG. 7

| Major Axis Direction | Cube Map Face | $s_c$ | $t_c$ | $r_c$ |
|---|---|---|---|---|
| +r_x | X+ face | -r_z | -r_y | r_x |
| -r_x | X- face | +r_z | -r_y | r_x |
| +r_y | Y+ face | +r_x | +r_z | r_y |
| -r_y | Y- face | +r_x | -r_z | r_y |
| +r_z | Z+ face | +r_x | -r_y | r_z |
| -r_z | Z- face | -r_x | -r_y | r_z |

$$s_{face} = \frac{1}{2} \times \frac{s_c}{|r_c|} + \frac{1}{2}$$

$$t_{face} = \frac{1}{2} \times \frac{t_c}{|r_c|} + \frac{1}{2}$$

FIG. 9

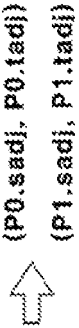

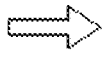

(P0.sface, P0.tface)
(P1.sface, P1.tface)

910

| sadj | Face of adjusted Pixel | | | | | |
|---|---|---|---|---|---|---|
| Face of Reference | X+ | X− | Y+ | Y− | Z+ | Z− |
| X+ | sface | sface | −tface+1 | tface | sface+1 | sface+1 |
| X− | sface | sface | tface | −tface+1 | sface+1 | sface−1 |
| Y+ | tface+1 | −tface | sface | sface | −sface+1 | sface |
| Y− | −tface+2 | tface−1 | sface | sface | sface | −sface+1 |
| Z+ | sface+1 | sface−1 | sface | sface | sface | sface |
| Z− | sface−1 | sface+1 | −sface+1 | sface | sface | sface |

920

| tadj | Face of adjusted Pixel | | | | | |
|---|---|---|---|---|---|---|
| Face of Reference | X+ | X− | Y+ | Y− | Z+ | Z− |
| X+ | tface | tface | tface | −sface+2 | tface+2 | tface |
| X− | tface | tface | −sface | sface+1 | tface | tface |
| Y+ | −sface+1 | sface | tface | tface | tface+1 | −tface+2 |
| Y− | sface | −sface+1 | tface | tface | tface−1 | tface |
| Z+ | tface | tface | tface+1 | tface+1 | tface | tface |
| Z− | tface | tface | −tface+2 | tface | tface | tface |

$\dfrac{\partial s_{face}}{\partial x} = P1.s_{adj} - P0.s_{adj}$ $\dfrac{\partial t_{face}}{\partial x} = P1.t_{adj} - P0.t_{adj}$ (P0.sadj, P0.tadj)
(P1.sadj, P1.tadj)

GRAPHICS PROCESSING EMPLOYING CUBE MAP TEXTURING

CROSS-REFERENCE TO RELATED APPLICATION

This application claims the benefit of Korean Patent Application No. 10-2016-0174769, filed on Dec. 20, 2016, in the Korean Intellectual Property Office, the disclosure of which is incorporated by reference herein in its entirety.

1. TECHNICAL FIELD

The present disclosure relates generally to graphics processing and more particularly to graphics processing that involves determining a level of detail (LOD) for texturing a cube map.

2. DISCUSSION OF THE RELATED ART

Texturing or "texture mapping" is used to obtain a more realistic image in a three-dimensional (3D) graphics system. In graphics processing semantics, "texture" often refers to a 2D image. With texturing, a two-dimensional (2D) texture image is defined on a surface of a 3D object to thereby apply a texture to the surface of the 3D object. A texel, also called a texture element, is a fundamental unit of a texture map. Textures represent arrays of texels, similar to images represented by arrays of pixels in a screen space.

When an object surface in a 3D space is mapped to pixels of a 2D screen space in a 3D graphics pipeline process, texels each having a texture coordinate corresponding to the object surface are calculated. Texture mapping between a pixel and a texel may thus be performed.

Cube mapping refers to a way to map images of a 3D environment to a cube map (a virtual cube) placed within the environment. A view point in the 3D space is assumed to be at the cube center, and the surrounding environment is viewed from the view point by a virtual observer. Images of the 3D environment are mapped to each of the six cube faces to generate a "skybox" having the appearance of an unfolding of the cube, with the six cube face images viewable in respective squares.

SUMMARY

Provided are a method and apparatus for determining a level of detail (LOD) for texturing a cube map.

Additional aspects will be set forth in part in the description which follows and, in part, will be apparent from the description, or may be learned by practice of the presented embodiments.

According to an embodiment, a method of determining a level of detail (LOD) for texturing a cube map involves determining coordinates of pixels representing boundary points of an object on the cube map. A coordinate of at least one pixel from among the pixels may be transformed when at least first second pixels among the pixels respectively correspond to different faces of the cube map. Distances between the pixels on the cube map may be calculated by using the corrected coordinate. Based on the calculated distances, an LOD for texturing the cube map of the pixels may be determined.

The transforming may include transforming a coordinate of another pixel from among the pixels based on an origin and a coordinate axis of a face corresponding to a reference pixel from among the pixels.

The transforming may include transforming coordinates of the pixels based on a coordinate transformation table including information about a transformation operation required for the coordinates of the pixels.

Derivatives of the pixels may be calculated based on the distances, and the LOD may be based on the derivatives.

The cube map may be a cubic texture including six square faces having a normalized size.

The transforming may include determining, based on a directional vector of the pixels in a screen space, whether the pixels respectively correspond to the different faces of the cube map.

According to an aspect of another embodiment, an apparatus for determining a level of detail (LOD) for texturing a cube map includes: a memory storing a computer-executable instruction; and a processor determining coordinates of adjacent pixels on the cube map by executing the computer-executable instruction, transforming a coordinate of at least one pixel from among the pixels when the pixels respectively correspond to different faces of the cube map, calculating derivatives of the pixels on the cube map by using the transformed coordinate, and determining, based on the calculated derivatives, an LOD for texturing the cube map on the pixels.

According to an aspect of another embodiment, there is provided a non-transitory computer-readable recording medium having recorded thereon a program for implementing a method of determining an LOD for texturing a cube map.

In another aspect, a graphics processing device includes memory storing a computer-executable instruction, and a processor configured to execute the computer-executable instructions to: generate graphics for rendering a scene having an object in a three dimensional view space; generate a cube map for providing a plurality of different views of the view space; determine coordinates representing extreme boundary points of the object, mapped to the cube map; when first and second parts of the object project to respective first and second cube faces of the cube map, transform a first coordinate of a pixel on the cube map, mapped to one of the boundary points and associated with the first cube map face, to a second coordinate associated with the second cube map face; calculate distances between the pixels on the cube map using the transformed coordinate; and determine, based on the calculated distances, a level of detail (LOD) for texturing the cube map with the object.

According to embodiments, since distances or derivatives of pixels may be directly calculated from transformed coordinates of the pixels on a cube map, the number of processing elements used for calculating the distances or derivatives may be reduced and thus processing cost and power consumption of an apparatus may be reduced.

BRIEF DESCRIPTION OF THE DRAWINGS

These and/or other aspects will become apparent and more readily appreciated from the following description of the embodiments, taken in conjunction with the accompanying drawings in which:

FIG. 7 shows a table and equations for correlating a coordinate of a pixel on a cube map with the pixel in a screen space;

FIG. 9 is a diagram illustrating calculation of distances between pixels by using a coordinate transformation table according to an embodiment;

DETAILED DESCRIPTION

Embodiments are described below as an exemplary purpose only with reference to the accompanying drawings. The following embodiments are provided solely for specifying technical content and not for restricting or limiting the scope of the disclosure. It is understood that information which is easily inferred by those of ordinary skill in the art from the detailed description section and embodiments falls within the scope of the disclosure.

The terms "comprises" and/or "comprising" used herein should not be construed to necessarily include all of a plurality of elements or operations described in the specification. Some elements or operations may not be included, or additional elements or operations may be further included.

Also, it will be understood that although the terms "first", "second", etc. may be used herein to describe various components, these components should not be limited by these terms. These components are only used to distinguish one component from another.

Herein, the term "view space" is used to refer to space in a 3D graphics environment viewable from a view point at the center of a virtual cube placed in the environment.

Embodiments of the inventive concept relate to a method and apparatus for processing a texture of a cube map. Descriptions of aspects which are well known to those of ordinary skill in the art are omitted.

Figure 1:
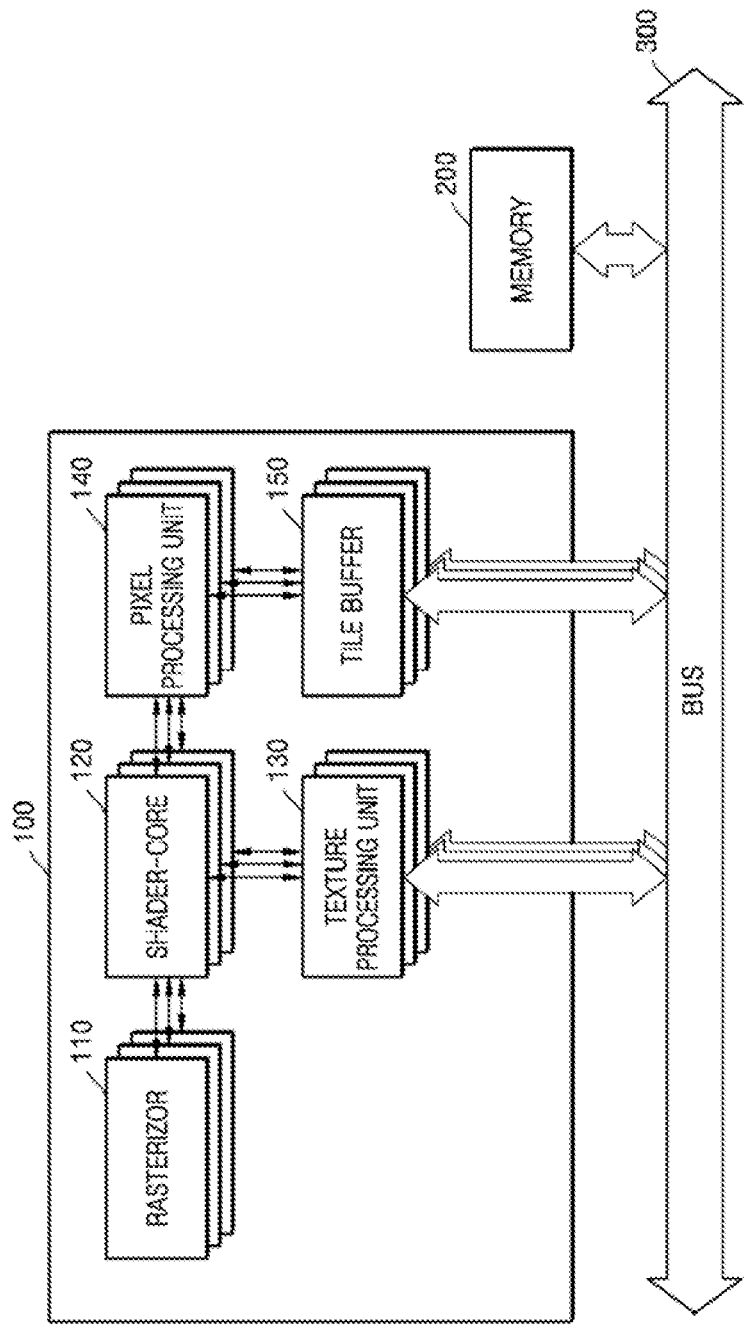
FIG. 1 is a diagram of a graphics processing apparatus according to an embodiment.

FIG. 1 is a diagram of a graphics processing apparatus 100 according to an embodiment. Graphics processing apparatus 100 may include a rasterizer 110, a shader core 120, a texture processing unit 130, a pixel processing unit 140, and a tile buffer 150. The graphics processing apparatus 100 may write/read data to/from a memory 200 external to graphics processing apparatus 100 via a bus 300.

In FIG. 1, the graphics processing apparatus 100 for processing three-dimensional (3D) graphics may use tile-based rendering (TBR). In other words, in order to generate 3D graphics corresponding to one frame, the graphics processing apparatus 100 may allow a plurality of tiles that are divided to have predetermined sizes to pass through the rasterizer 110, the shader core 120, and the pixel processing unit 140 and may allow a processing result to be stored in the tile buffer 150. The graphics processing apparatus (device) 100 may process all of tiles constituting a frame in parallel by using a plurality of channels each of which includes the rasterizer 110, the shader core 120, and the pixel processing unit 140. Once a plurality of tiles corresponding to one frame is processed, the graphics processing apparatus 100 may transmit a processing result stored in the tile buffer 150 to a frame buffer (not shown) of the memory 200.

The rasterizer 110 may rasterize a primitive generated from a vertex shader through geometric transformation.

The shader core 120 may receive the primitive rasterized by the rasterizer 110 and may perform pixel shading. The shader core 120 may perform the pixel shading to determine colors of all of pixels constituting titles including fragments of the rasterized primitive. The shader core 120 may use a pixel value generated by using a texture in order to generate stereoscopic and realistic 3D graphics during the pixel shading.

The shader core 120 may include a pixel shader. Also, the shader core 120 may be a type further including a vertex shader or a unified shader in which a vertex shader and a pixel shader are combined with each other. When the shader core 120 functions as a vertex shader, the shader core 120 may generate a primitive that represents an object and may transmit the primitive to the rasterizer 110.

When the shader core 120 requests the texture processing unit 130 to send a pixel value corresponding to a desired pixel, the texture processing unit 130 may transmit a pixel value generated by processing a texture that is previously prepared.

The texture may be stored in a predetermined space inside or outside the texture processing unit 130 or in the memory 200. When the texture used to generate the pixel value requested by the shader core 120 is not stored in the predetermined space inside the texture processing unit 130, the texture processing unit 130 may bring and use the texture from the predetermined space outside the texture processing unit 130 or from the memory 200.

The pixel processing unit 140 may determine a pixel value to be finally displayed by performing a process such as a depth test performed on pixels corresponding to the same location in one tile and may determine all pixel values corresponding to the one tile.

The tile buffer 150 may store the all pixel values corresponding to the one tile transmitted from the pixel processing unit 140. When graphics processing on all of tiles constituting one frame is completed, a processing result stored in the tile buffer 150 may be transmitted to the frame buffer of the memory 200.

It will be understood by one of ordinary skill in the art that the graphics processing apparatus 100 may further include elements other than elements illustrated in FIG. 1. Further, each of the rasterizer 110, shader-core 120, pixel processing unit 140, and texture processing unit 130 may be embodied as a hardware circuit; and all of these elements may be embodied as part of a common processor. Each of these elements may thereby be called a "circuit". The processor may be a dedicated processor or a general purpose processor which loads a program from a memory, executes the instructions, and is thereby transformed into a special purpose processor. Tile buffer 150 may be a memory or memory circuit.

Figure 2:
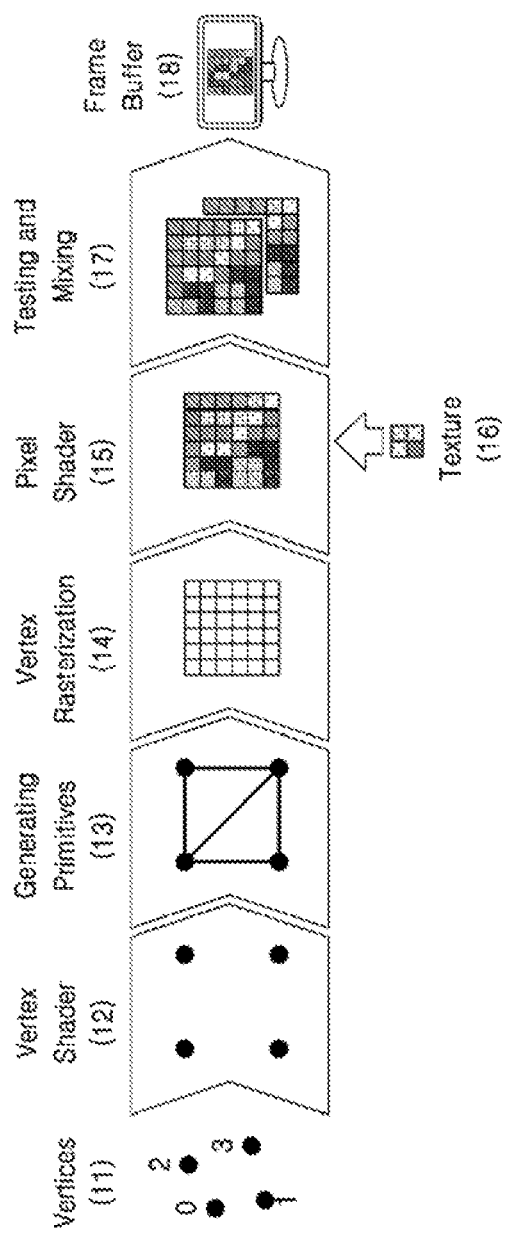
FIG. 2 is a diagram illustrating a process by which a graphics processing apparatus processes three-dimensional (3D) graphics.

FIG. 2 is a diagram for explaining a process performed by the graphics processing apparatus 100 to process 3D graphics. A process of processing 3D graphics may be roughly divided into three processes, that is, geometric transformation, rasterization, and pixel shading, which will now be explained in more detail. 3D graphics processing is illustrated with operations 11 through 18.

At operation 11, vertices are generated. The vertices are generated in order to represent objects included in 3D graphics.

Operation 12 is an operation in which the generated vertices are shaded. A vertex shader may perform shading on the vertices by designating locations of the vertices that are generated in operation 11.

Operation 13 is an operation in which primitives are generated. The term 'primitive' refers to a point, a line, or a polygon formed by using one or more vertices. For example, a primitive may be a triangle formed by connecting three vertices.

At operation 14, the primitives are rasterized. When a primitive is said to be rasterized, this means that the primitive is divided into fragments. The term 'fragment' may be a basic unit for performing graphics processing on a primitive. Since a primitive includes only information about vertices, 3D graphics processing may be performed by generating fragments between vertices during rasterization.

Operation 15 is an operation in which pixels are shaded. Fragments constituting the primitives and generated during rasterization may be pixels. The terms 'fragment' and 'pixel' are interchangeably used in the art. For example, a pixel shader may be referred to as a fragment shader. In general, a basic unit of graphics processing which constitutes a primitive may be referred to as a fragment and a basic unit of the graphics processing after pixel shading may be referred to as a pixel. Values, attributes (e.g., colors), etc. of the pixels may be determined during pixel shading.

At operation 16, texturing for determining colors of the pixels is performed. Texturing involves a process of determining a color of a pixel by using an image (generated or obtained previously), that is, a texture. In this case, when a color of each pixel is calculated and determined in order to express various colors and patterns in the real world, the number of data computations that are necessary for graphics processing and a graphics processing time increase. Accordingly, a graphics processing apparatus may determine a color of a pixel by using a texture that is previously prepared.

At operation 17, testing and mixing are performed. Pixel values to be finally displayed are determined by performing a process such as a depth test, curling, or clipping.

In operation 18, the frame generated in operations 11 through 17 is stored in a frame buffer and is displayed on a display device.

While operations in processing 3D graphics of FIG. 2 have been briefly explained, more detailed processes operations are known to one of ordinary skill in the art.

Figure 3:
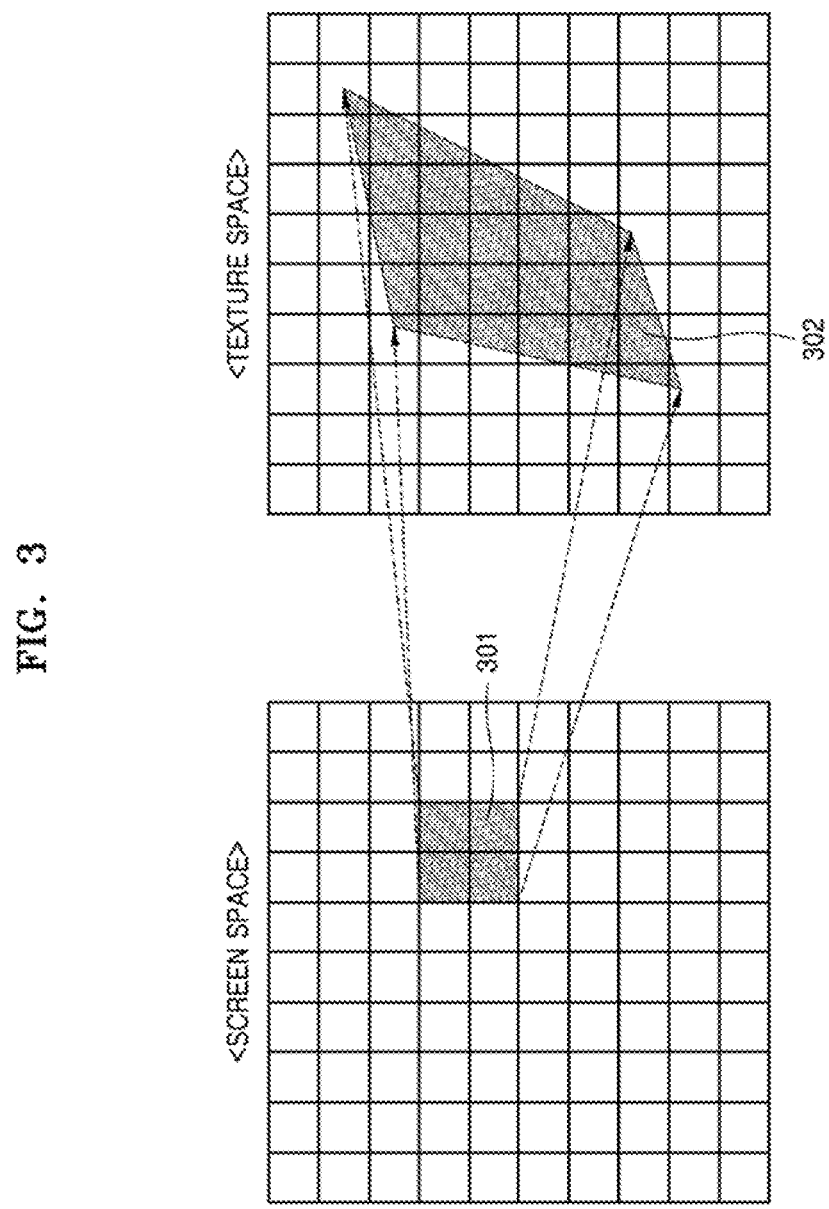
FIG. 3 is a diagram illustrating texture mapping.

FIG. 3 is a diagram for explaining texture mapping. When pixels 301 in a screen space are generated during rasterization, texture processing unit 130 may determine a texture 302 to be mapped to the pixels 301. Texture 302 may be an image having information about a color, a surface texture, and a pattern of a 3D object and includes texels in a texture space.

Since a size of an object may vary in the screen space, it is difficult to prepare the textures 302 corresponding to all pixels 301. Accordingly, the texture processing unit 130 may perform texture filtering for estimating values of the pixels 301 through interpolation using one texture or a plurality of textures.

Meanwhile, the texture processing unit 130 may determine a cube map to be mapped to adjacent pixels in the screen space. The cube map may denote a cubic texture including six faces. As mentioned earlier, a cube map may include six faces expressing a neighboring environment (a view space) viewed from a specific viewpoint. Also, the cube map may be used for various effects in graphics processing. For example, the cube map may be used as source data for reflection and lighting effects inside a scene to be rendered. Therefore, the texture processing unit 130 may perform texturing by using a cube map prepared in advance. Herein, when a cube map is said to "map to adjacent pixels in a screen space" or the like, this signifies that image elements in the view space are mapped to the faces of the cube map. For instance, considering a virtual camera situated at a viewpoint coinciding with the center of the cube map, a field of view of the virtual camera may coincide with the edges of a cube face, so that image elements in that field of view are mapped to that cube face.

Figure 4:
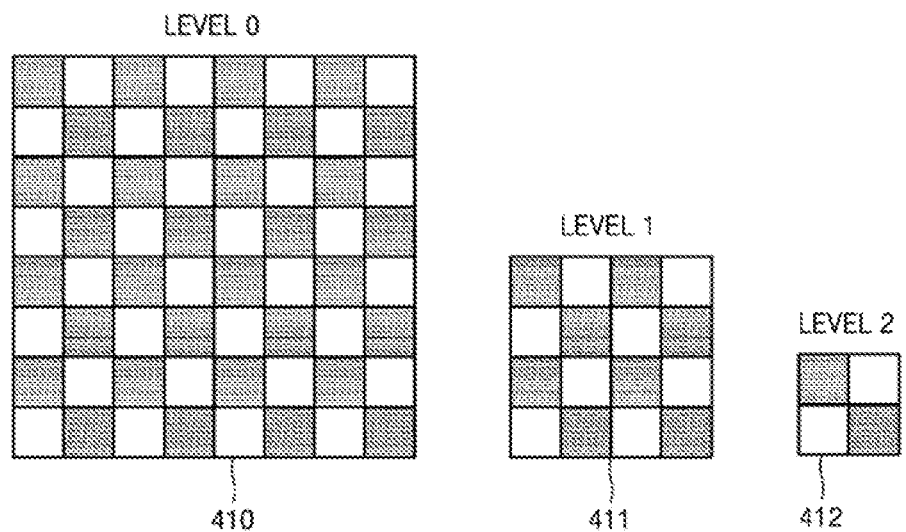
FIG. 4 is a diagram illustrating a mipmap.

FIG. 4 is a diagram for explaining a mipmap. Texture processing unit 130 may use a pre-generated texture, in order to adapt to a size of an object which changes in a view space. In this case, a bitmap image set including a basic texture and downsized textures thereof is referred to as a mipmap.

In this case, mipmaps of different levels may have different resolutions. In FIG. 4, a level 0 mipmap 410 that is a texture with a highest resolution from among textures may be a basic texture. In order to represent the level 0 mipmap 410, 8×8 texels are needed. Also, a mipmap whose size is ¼ a size of the basic texture is a level 1 mipmap 411. In order to represent the level 1 mipmap 411, 4×4 texels are needed. Also, a mipmap that is ¹⁄₁₆ the size of the basic texture may be a level 2 mipmap 412. In order to represent the level 2 mipmap 412, 2×2 texels are needed.

As a distance between a view point and a pixel changes, a texture mapped to the pixel may change. For example, when tiles of a road are displayed in a screen space, a texture mapped to pixels corresponding to a tile close to a view point may be the level 0 mipmap 410 with a high resolution. Also, a texture to be mapped to pixels corresponding to a tile of the road far from the view point may be the level 2 mipmap 412 with a low resolution. That is, when a plurality of mipmaps is used, an object at a far distance is represented at a low resolution, a graphics processing apparatus may naturally represent 3D graphics. In addition, when texture filtering is performed on a boundary between pixels to which different textures are mapped, the quality of the 3D graphics may be improved.

Meanwhile, although mipmaps have been described based on a 2D texture in FIG. 4, mipmaps may be prepared and used for a cube map including six texture faces.

Also, textures to be mapped to pixels in a screen space may be determined based on a level of detail (LOD) of graphics. The LOD refers to a precision of a 3D graphic image. Texture processing unit 130 may receive pixel information, determine an LOD value of graphics, and determine mipmaps needed to perform texture filtering according to the determined LOD value. Although the texture processing unit may calculate an LOD value of graphics in units of quads each including, for example, 2×2 pixels, other basic sets of pixel numbers may be utilized.

Likewise, a cube map to be mapped to pixels in the screen space may be determined based on an LOD of graphics. Therefore, after receiving pixel information, the texture processing unit 130 may determine an LOD value of graphics and determine mipmaps needed to perform texture filtering according to the determined LOD value.

Figure 5:
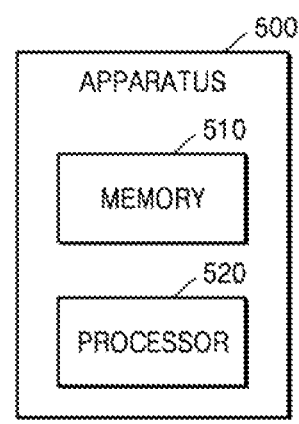
FIG. 5 is a block diagram of an apparatus for determining a level of detail (LOD) for texturing a cube map according to an embodiment.

FIG. 5 is a block diagram of an apparatus 500 for determining an LOD for texturing a cube map according to an embodiment.

The apparatus 500 may include a memory 510 and a processor 520. In the apparatus 500 illustrated in FIG. 5, only elements related to embodiments of determining an LOD for texturing a cube map are illustrated. Therefore, it will be understood by a person of ordinary skill in the art that general-purpose elements other than the elements illustrated in FIG. 5 may be further included. Also, according to an embodiment, the apparatus 500 may be included in the texture processing unit 130 of FIG. 1 and implemented by using detailed elements inside the texture processing unit 130 but is not limited thereto.

The memory 510 may store a computer-executable instruction.

The processor 520 may determine coordinates of adjacent pixels on a cube map by executing the computer-executable instruction stored in the memory 510. In other words, the processor 520 may transform a coordinate of each of adjacent pixels in a screen space into a coordinate on a cube map which is a texture space. According to an embodiment, the processor 520 may determine a coordinate of a point as a coordinate of a pixel on the cube map, the point obtained by projecting the pixel to the cube map based on a directional vector of the pixel in the screen space. An embodiment determining a coordinate of a pixel on the cube map is described with reference to FIGS. 6 to 8.

Figure 6:
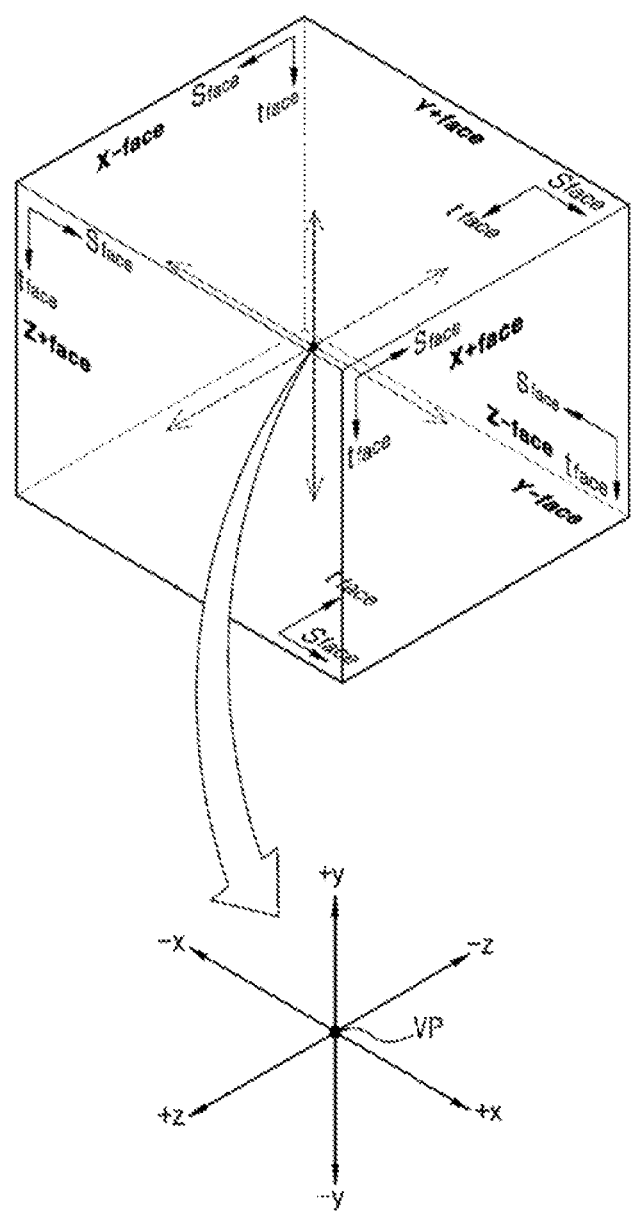
FIG. 6 is a diagram of a coordinate system in a screen space and a coordinate system on a cube map according to an embodiment.

FIG. 6 is a diagram of a coordinate system in a screen space and a coordinate system on a cube map according to an embodiment.

In the discussion of FIG. 6 and hereafter, "screen space" may be understood to be "view space". FIG. 6, the screen space may have a 3D coordinate system including the x-axis, the y-axis, and the z-axis perpendicular to one another. The cube map may include six faces each including a 2D coordinate system including an $s_{face}$-axis and a $t_{face}$-axis based on an origin corresponding to a viewpoint $V_P$ in an environment of a scene with various objects (a view space). Specifically, it may be assumed that an origin in the view space is located at a center of the cube map. The cube map may include an X+ face, an X− face, a Y+ face, a Y− face, a Z+ face, and a Z− face, wherein the X+ face crosses a +x-axis, the X− face crosses an −x-axis, the Y+ face crosses an +y-axis, the Y-face crosses an −y-axis, the Z+ face crosses an +z-axis, and the Z− face crosses a −z-axis. Each of the six faces may have a 2D coordinate system including an $s_{face}$-axis and a $t_{face}$-axis based on an origin of each face, where the origin of each face is assumed to be located in a corner of the face, as seen in FIG. 6.

FIG. 7 shows a table and equations for correlating a coordinate of a pixel on a cube map with the pixel in a screen space. In the description of FIG. 7 and hereafter, a pixel in a screen space refers to an image element of an object in a view space viewed from the center of the cube map (the viewpoint VP).

The processor 520 may determine a coordinate of a pixel on a cube map based on a table 710 and equations 720.

In the case where a directional vector of a pixel in the screen space is $(r_x, r_y, r_z)$ (here, each of $r_x$, $r_y$, and $r_z$ is a real number), the processor 520 may determine a major axis direction based on a magnitude and a sign of each of $r_x$, $r_y$, and $r_z$ of a pixel and thus determine a cube map face mapped to that pixel The variables $s_c$, $t_c$, and $r_r$ define the pixel position as described below.

For example, in the case where $r_x$ has a largest magnitude and a positive number from among $r_x$, $r_y$, and $r_z$, the processor 520 may determine a major axis direction of a pixel as the +x-axis, thus determine that the pixel corresponds to the X+ face of the cube map and determine that $r_c$ of the pixel is $r_x$, drawn from the center point $V_P$ of the cube map. Sc and to are axial coordinate components of the pixel's position along axes that are each orthogonal to $r_c$ (and to each other). Thus, $(s_c, t_c, r_c)$ of the pixel is determined as $(-r_z, -r_y, r_x)$. Therefore, the processor 520 may determine a coordinate $(s_{face}, t_{face})$ mapped to the pixel on the X+ face by using the determined $(s_c, t_c, r_c)$. The equations 720, which may be used for the mapping, may be understood based on a normalized cube map size where each cube face is a size of "1" in each direction. Since the origin of the coordinate system for each cube face begins at a corner of the cube face, whereas $r_c$ is drawn from the center of the cube, the normalizer "½" is used as both a multiplier and a constant in eqns. 720 for proper coordinate mapping from the pixel coordinates to the cube face coordinates. (Equations 720 are known in the related art for mapping texture coordinates to cube map faces in an Open GL graphics library, for example.)

Likewise, in the case where $r_z$ has a largest magnitude and a negative number from among $r_x$, $r_y$, and $r_z$, the processor 520 may determine a major axis direction of a pixel as the +z-axis, thus determine that the pixel corresponds to the Z− face of the cube map and determine $(s_c, t_c, r_c)$ of the pixel as $(-r_x, -r_y, r_z)$. Therefore, the processor 520 may determine a coordinate $(s_{face}, t_{face})$ on the Z− face by using the determined $(s_c, t_c, r_c)$.

Figure 8:
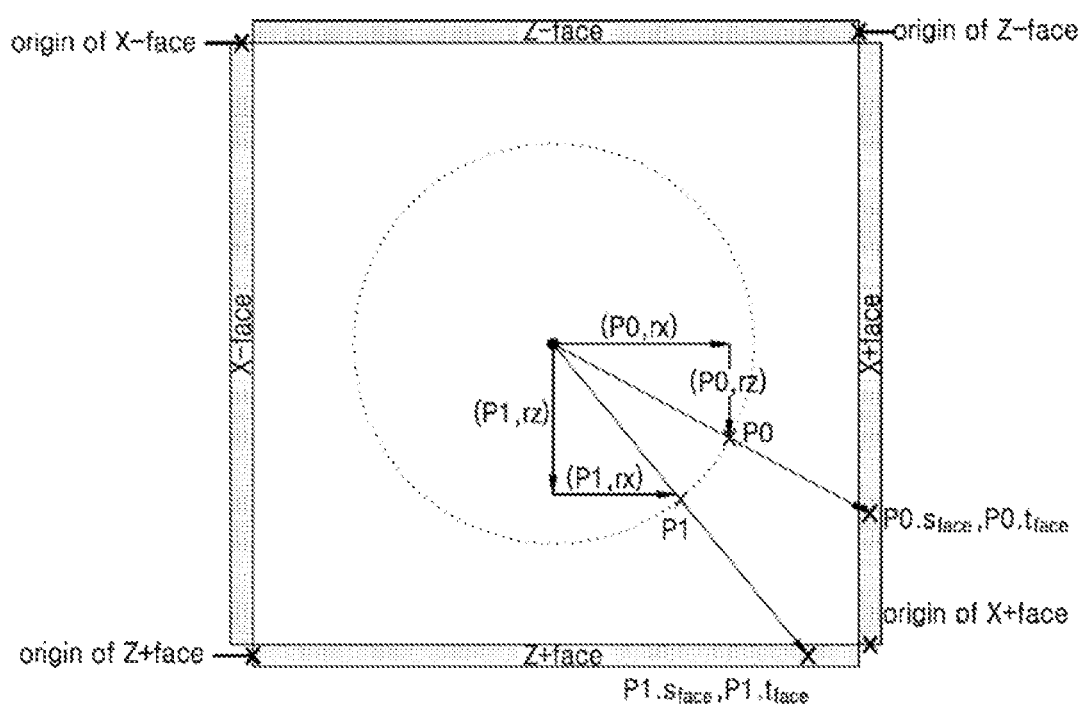
FIG. 8 is a diagram for explaining an embodiment of determining a coordinate of a pixel on a cube map corresponding to the pixel in a screen space.

FIG. 8 is a diagram for explaining an embodiment of determining a coordinate of a pixel on a cube map corresponding to the pixel in a screen space. FIG. 8 is also a top view of the cube map of FIG. 6 (looking into the Y+ face).

Figure 10:
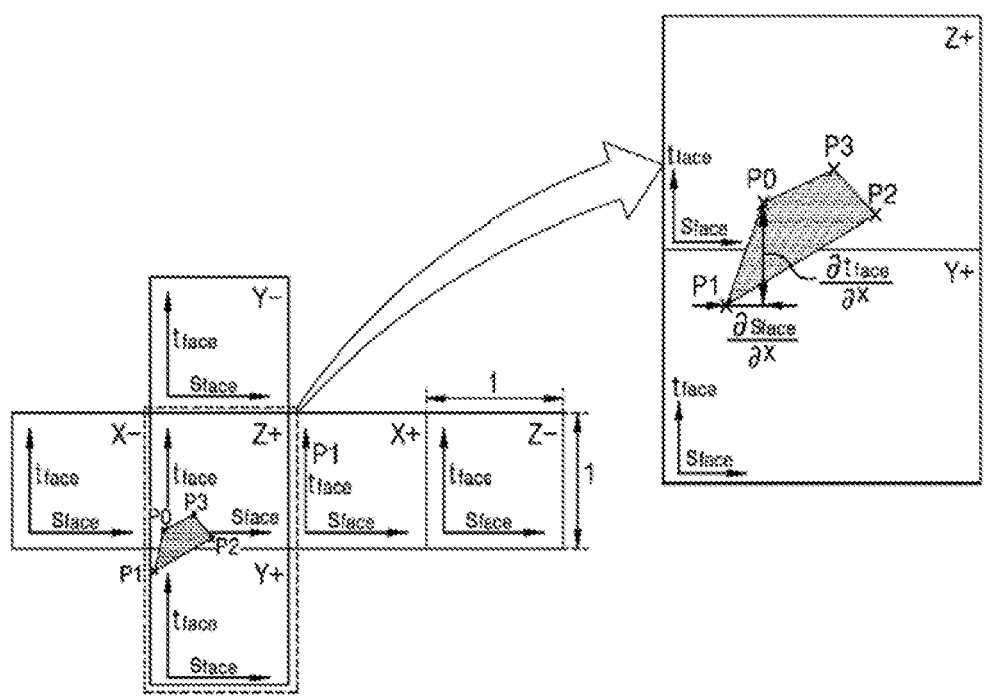
FIG. 10 is a diagram of an embodiment of calculating distances of pixels by transforming coordinates of the pixels.

The processor 520 may determine coordinates of pixels P0 and P1 on a cube map corresponding to the pixels P0 and P1 in a screen space. In other words, the processor 520 may determine coordinates of points of the pixels P0 and P1 projected to the cube map. Pixels P0 and P1, also exemplified in FIGS. 10 and 11, may each represent an extreme boundary point of an object in the view space. For instance, referring momentarily to FIG. 10, an object may be approximated as being within the pixel space (the shaded area) bounded by outer pixels P0, P1, P2 and P3. One part of the object's image may project to a first cube face, e.g. Y+, while another part of the object projects to a second cube face, e.g., Z+. In this case, in accordance with the inventive concept, a level of detail (LOD) may be determined differently as compared to the case where the entire object projects to only a single cube face. For example, FIG. 10 depicts a "skybox" in which the cube map is "unfolded". In the skybox representation of the environment, part of the object projecting to the Y+ face appears adjacent to the part of the object projecting to the Z+ face, so that the object appears flat. The LOD may be determined as a value proportional to a "maximum dimension" of the object as measured between the extreme boundary pixels. For instance, if the distance between P1 and P3 (P1-P3) is the longest distance among the other inter-pixel distances (P1-P2, P1-P0, etc.), then the LOD may be based on the distance P1-P3. The LOD may thereby represent an appropriate level of resolution, in consideration of the ultimate layout of the object's image in the skybox. (More specifically, the LOD may be based on "derivatives of the pixels" which are a function of the inter-pixel distances on both the cube-map and in the screen space, as discussed below.) Note that the pixels such as P0, P1, P2 and P3 may each represent a boundary position of an object at which an inflection point occurs, similar to a vertex of a 3D object primitive.

Returning to FIG. 8, for convenience of description and understanding, a case is described where a directional vector in the y-axis of each of the pixels P0 and P1 is 0. As illustrated in FIG. 9, a coordinate of the pixel P0 in the screen space is (P0.rx, 0, P0.rz), and a coordinate of the pixel P1 in the screen space is (P1.rx, 0, P1.rz).

The processor 520 may determine a coordinate of the pixel P0 projected to the cube map as (P0.$s_{face}$, P0.$t_{face}$) on the X+ face of the cube map based on the directional vector (P0.rx, 0, P0.rz) of the pixel P0. For example, the processor 520 may determine the coordinate of the pixel P0 as (P0.$s_{face}$, P0.$t_{face}$) on the X+ face of the cube map by using table 710 and equation 720 of FIG. 7. Likewise, the processor 520 may determine a coordinate of the pixel P1 on the cube map as (P1.$s_{face}$, P1.$t_{face}$) on the Z+ face of the cube map based on the directional vector (P1.rx, 0, P1.rz) of the pixel P1. For example, the processor 520 may determine the coordinate of the pixel P1 as (P1.$s_{face}$, P1.$t_{face}$) on the Z+ face of the cube map by using table 710 and equation 720 of FIG. 7.

Referring to FIG. 5 again, when pixels respectively correspond to different faces of the cube map, the processor 520 may transform a coordinate of at least one pixel from among the pixels by executing a computer-executable instruction.

First, the processor 520 may determine whether pixels respectively correspond to different faces of the cube map. In other words, the processor 520 may determine whether pixels in the view space are projected to different faces of the cube map.

Also, according to another embodiment, the processor 520 may determine whether pixels respectively correspond to different faces of the cube map based on directional vectors of the pixels in the view space. Specifically, the processor 520 may determine major axis directions of pixels based on the directional vectors of the pixels in the view space, and when major axis directions of the pixels are different from each other, determine that the pixels are projected to the different faces of the cube map. Referring to an example of FIG. 8, the processor 520 may determine that a major axis direction of the pixel P0 is the +x-axis based on a magnitude and a sign of each of coordinates of the directional vector (P0.rx, 0, P0.rz) of the pixel P0 and determine that a major axis direction of the pixel P1 is the −z-axis based on a magnitude and a sign of each of coordinates of the directional vector (P1.rx, 0, P1.rz) of the pixel P1. Therefore, the processor 520 may determine that the pixels P0 and P1 are respectively projected to different faces of the cube map.

Next, when adjacent pixels respectively correspond to different faces of the cube map, the processor 520 may transform a coordinate of at least one pixel on the cube map from among the pixels. According to an embodiment, the processor 520 may transform a coordinate of another pixel from among the pixels based on an origin and a coordinate axis of a face corresponding to a reference pixel from among the pixels. For example, in the case where a first pixel and a second pixel are respectively projected to the X+ face and the Y− face, the processor 520 may transform a coordinate of the second pixel on the cube map based on an $s_{face}$ axis and a $t_{face}$ axis of the X+ face to which the first pixel, which is a reference pixel, is projected.

Also, when adjacent pixels respectively correspond to different faces of the cube map, the processor 520 may transform coordinates of pixels on the cube map based on a coordinate transformation table including information about a transformation operation required for coordinates of the pixels. The coordinate transformation table may include information about an operation by which coordinates of pixels should be corrected based on faces respectively corresponding to the pixels.

For example, the processor 520 may transform a coordinate of a pixel by performing at least one of an addition operation and an inversion operation on the coordinate of the pixel. As a specific example, the processor 520 may perform an addition operation of +1, −1, or +2 on a pixel and perform an inversion operation of inverting a sign of a pixel on the pixel. Also, the processor 520 may perform an operation of swapping coordinates of a pixel from a coordinate ($s_{face}$, $t_{face}$) to a coordinate ($t_{face}$, $s_{face}$).

The processor 520 may calculate distances between pixels, and derivatives, on the cube map by using transformed coordinates on the cube map of the pixels by executing a computer-executable instruction.

Derivatives of pixels may denote ratios of amounts of changes of pixels on the cube map to amounts of changes of pixels in the screen space. Specifically, derivatives of pixels may denote ratios of distances between pixels on a coordinate axis of the cube map to distances between pixels on a coordinate axis of the screen space. Also, when a distance between pixels on a coordinate axis of the screen space is constant, the processor 520 may calculate derivatives of pixels by calculating distances between the pixels on a coordinate axis of the cube map. Also, the processor 520 may calculate derivatives of pixels as approximations and thus calculate distances between pixels on a coordinate axis of the cube map as derivatives of the pixels.

Specifically, the processor 520 may calculate distances between pixels on a coordinate axis $s_{face}$ of the cube map as derivatives of the pixels on the coordinate axis $s_{face}$ of the cube map. In other words, the processor 520 may calculate a difference between coordinates of each of pixels on the coordinate axis $s_{face}$ of the cube map. Also, the processor 520 may calculate distances between pixels on a coordinate axis $t_{face}$ of the cube map as derivatives of the pixels on the coordinate axis $t_{face}$ of the cube map. In other words, the processor 520 may calculate a difference between coordinates of each of pixels on the coordinate axis $t_{face}$ of the cube map.

FIG. 9 is a diagram illustrating calculation of derivatives of pixels by using a coordinate transformation table according to an embodiment.

The processor 520 may transform coordinates of pixels on the cube map based on coordinate transformation tables 910 and 920.

Specifically, the coordinate transformation table 910 is a table for transforming a coordinate value $s_{face}$ of a pixel, and the coordinate transformation table 920 is a table for transforming a coordinate value $t_{face}$ of a pixel. Also, in each of the coordinate transformation tables 910 and 920, "Face of Reference" represents a face to which a reference pixel from among pixels is projected, and "Face of adjusted Pixel" represents a face to which a pixel whose coordinate is to be transformed is projected.

In an example of the pixel P0 and the pixel P1, a coordinate of the pixel P0 on the cube map is a coordinate (P0.$s_{face}$, P0.$t_{face}$) on the X− face, and a coordinate of the pixel P1 on the cube map is a coordinate (P1.$s_{face}$, P1.$t_{face}$).

In the case where a reference pixel is the P0, since "Face of Reference" and "Face of adjusted Pixel" of the pixel P0 are identically the X− face, an adjusted coordinate (P0.$s_{adj}$, P0.$t_{adj}$) of the pixel P0 is maintained as the original coordinate (P0.$s_{face}$, P0.$t_{face}$) by the coordinate transformation tables 910 and 920. However, in the case of the pixel P1, since "Face of Reference" of the pixel P1 becomes the X− face and "Face of adjusted Pixel" of the pixel P1 becomes the Y+ face, an adjusted coordinate (P1.$s_{adj}$, P1.$t_{adj}$) of the pixel P1 becomes (P1.$t_{face}$, −P1.$s_{face}$).

Subsequently, the processor 520 may calculate derivatives of pixels on the cube map by using transformed coordinates of the pixels. That is, the processor 520 may calculate $$\frac{\partial s_{face}}{\partial x},$$

which is a derivative of pixels on a coordinate axis $s_{face}$ of the cube map by using transformed coordinates of the pixels and calculate $$\frac{\partial t_{face}}{\partial x},$$

which is a derivative of pixels on a coordinate axis $t_{face}$ of the cube map.

Specifically, when distances of pixels on a coordinate axis of the view space are constant, the processor 520 may determine ∂x, which is a derivative of pixels on an x-axis of the screen space, as 1. Therefore, the processor 520 may calculate $$\frac{\partial s_{face}}{\partial x},$$

which is a derivative of pixels on a coordinate axis $s_{face}$ of the cube map, as P1.$s_{adj}$−P0.$s_{adj}$, which is a difference between coordinate values of the pixel P0 and the pixel P1 on the coordinate axis $s_{face}$ of the cube map. Likewise, the processor 520 may calculate $$\frac{\partial t_{face}}{\partial x},$$

which is a derivative of pixels on a coordinate axis $t_{face}$ of the cube map, as P1.$t_{adj}$−P0.$t_{adj}$, which is a difference between coordinate values of the pixel P0 and the pixel P1 on the coordinate axis $t_{face}$ of the cube map.

FIG. 10 is a diagram of an embodiment of calculating derivatives of pixels by transforming coordinates of the pixels.

FIG. 10 illustrates projected pixels P0, P1, P2, and P3 on the cube map. In the case where the pixels P0, P1, P2, and P3 are included in different faces on the cube map, the processor 520 may transform coordinates of the pixels P0, P1, P2, and P3 on the cube map.

According to an embodiment, since the pixels P0 and P1 are respectively included in the Z+ face and the Y+ face, the Z+ face and the Y+ face being faces different from each other, the processor 520 may transform a coordinate (P1.$s_{face}$, P1.$t_{face}$) of the pixel P1 on the cube map based on an origin and a coordinate axis of the Z+ face to which the pixel P0, which is a reference pixel, is projected. First, since the directions of the $s_{face}$-axes of the Z+ face are parallel to and coincide with each other, the processor 520 may determine $s_{face}$ coordinate values of the pixel P1 as P1.$s_{face}$. Next, since the cube map is a normalized cube map having a size of 1, the processor 520 may determine that an origin of the Y+ face is apart from an origin of the Z+ face in a −$t_{face}$ axis direction by a distance of 1. Therefore, the processor 520 may transform P.$t_{face}$, which is a $t_{face}$ coordinate value of the pixel P1 on the Y+ face, to −(1−P.$t_{face}$), which is a $t_{face}$ coordinate value on the Z+ face. Therefore, the processor 520 may transform a coordinate (P1.$s_{face}$, P1.$t_{face}$) of the pixel P1 on the cube map to a coordinate (P1.$s_{face}$, P1.$t_{face}$−1). Likewise, the processor 520 may transform a coordinate of a pixel P3 on the cube map, the pixel P3 projected to a face different from a face of the pixel P0.

Subsequently, the processor 520 may calculate derivatives $$\frac{\partial s_{face}}{\partial x} \text{ and } \frac{\partial t_{face}}{\partial x}$$

of the pixel P0 and the pixel P1 based on a coordinate of the pixel P0 and a transformed coordinate of the pixel P1. Specifically, the processor 520 may calculate derivatives $$\frac{\partial s_{face}}{\partial x} = P1.s_{face} - P0.s_{face} \text{ and } \frac{\partial t_{face}}{\partial x} = (P1.t_{face} - 1) - P0.t_{face}$$

of the pixel P0 and the pixel P1 based on a coordinate (P0.$s_{face}$, P0.$t_{face}$) of the pixel P0 and a coordinate (P1.$s_{face}$, P1.$t_{face}$−1) of the transformed pixel P1. Likewise, the processor 520 may calculate derivatives of the pixel P0 and the pixel P2 and derivatives of the pixel P0 and the pixel P3.

According to another embodiment, since the pixels P0 and P1 are respectively included in the Z+ face and the Y+ face, the Z+ face and the Y+ face being faces different from each other, the processor 520 may transform a coordinate (P0.$s_{face}$, P0.$t_{face}$) of the pixel P0 on the cube map and a coordinate (P1.$s_{face}$, P1.$t_{face}$) of the pixel P1 on the cube map based on the coordinate transformation tables 910 and 920. Specifically, the processor 520 may determine a reference pixel as the pixel P0, and since "Face of Reference" and "Face of adjusted pixel" of the pixel P0 are identically the Z+ face, maintain the transformed coordinate (P0.$s_{adj}$, P0.$t_{adj}$) of the pixel P0 as the original coordinate (P0.$s_{face}$, P0.$t_{face}$) by using the coordinate transformation tables 910 and 920. Next, since "Face of Reference" of the pixel P1 is the Z+ face and "Face of adjusted pixel" of the pixel P1 is the Y+ face, the processor 520 may transform the corrected coordinate (P1.$s_{adj}$, P1.$t_{adj}$) of the pixel P1 to a coordinate (P1.$s_{face}$, P1.$t_{face}$−1) by using the coordinate correction tables 910 and 920. Likewise, the processor 520 may transform a coordinate of the pixel P3 on the cube map, the pixel P3 projected to a face different from a face of the pixel P0.

Subsequently, the processor 520 may calculate derivatives $$\frac{\partial s_{face}}{\partial x} = P1.s_{adj} - P0.s_{adj} = P1.s_{face} - P1.s_{face} \text{ and } \frac{\partial t_{face}}{\partial x} = P1.t_{adj} - P0.t_{adj} = (P1.t_{face} - 1) - P0.t_{face}$$

of the pixel P0 and the pixel P1 based on a transformed coordinate (P0.$s_{face}$, P0.$t_{face}$) of the pixel P0 and a transformed coordinate (P1.$s_{face}$, P1.$t_{face}$−1) of the pixel P1. Likewise, the processor 520 may calculate derivatives of the pixel P0 and the pixel P2 and derivatives of the pixel P0 and the pixel P3.

Figure 11:
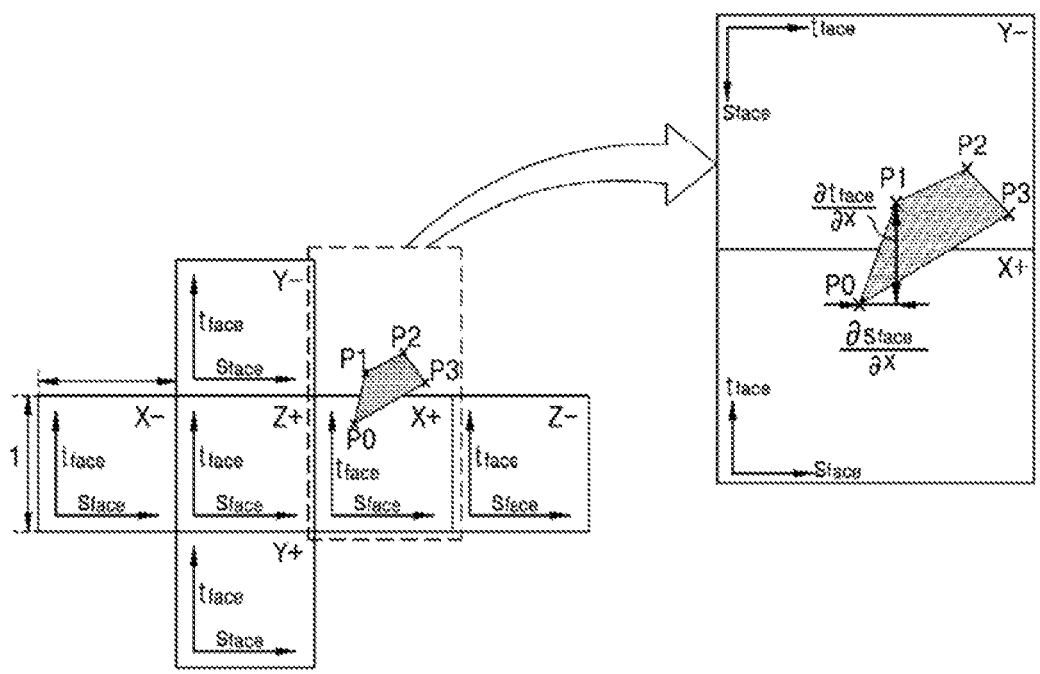
FIG. 11 is a diagram of another embodiment of calculating distances of pixels by transforming coordinates of the pixels.

FIG. 11 is a diagram of another embodiment of calculating derivatives of pixels by transforming coordinates of the pixels.

FIG. 11 illustrates pixels P0, P1, P2, and P3 projected on the cube map. In the case where the pixels P0, P1, P2, and P3 are included in different faces on the cube map, the processor 520 may transform coordinates of the pixels P0, P1, P2, and P3 on the cube map.

According to an embodiment, since the pixels P0 and P1 are respectively included in the X+ face and the Y− face, the X+ face and the Y− face being faces different from each other, the processor 520 may transform a coordinate (P1.$s_{face}$, P1.$t_{face}$) of the pixel P1 on the cube map based on an origin and a coordinate axis of the X+ face to which the pixel P0, which is a reference pixel, is projected. First, since directions of an $s_{face}$-axis of the X+ face and a $t_{face}$-axis of the Y− face are parallel to and coincide with each other, the processor 520 may determine an s coordinate value of the pixel P1 as P1.$t_{face}$. Next, since the cube map is a normalized cube map having a size of 1, the processor 520 may determine that an origin of the Y− face is apart from an origin of the X+ face in a $t_{face}$-axis direction by a distance of 2. Therefore, the processor 520 may transform P1.$t_{face}$, which is a $t_{face}$ coordinate value of the pixel P1 on the Y-face to (2−P1.$s_{face}$), which is a tae coordinate value on the X+ face. Therefore, the processor 520 may transform a coordinate (P1.$s_{face}$, P1.$t_{face}$) of the pixel P1 on the cube map to a coordinate (P1.$t_{face}$, 2−P1.$s_{face}$). Likewise, the processor 520 may transform coordinates of the pixels P2 and P3 projected to faces different from a face of the pixel P0.

Subsequently, the processor 520 may calculate derivative $$\frac{\partial s_{face}}{\partial x} \text{ and } \frac{\partial t_{face}}{\partial x}$$

of the pixel P0 and the pixel P1 based on a coordinate of the pixel P0 and a coordinate of the transformed pixel P1. Specifically, the processor 520 may calculate derivatives $$\frac{\partial s_{face}}{\partial x} = P1.t_{face} - P0.s_{face} \text{ and } \frac{\partial t_{face}}{\partial x} = (2 - P1.s_{face}) - P0.t_{face}$$

of the pixel P0 and the pixel P1 based on a coordinate (P0.$s_{face}$, P0.$t_{face}$) of the pixel P0 and a coordinate (P1.$t_{face}$, 2−P1.$s_{face}$) of the transformed pixel P1. Likewise, the processor 520 may calculate derivatives of the pixel P0 and the pixel P1 and derivatives of the pixel P0 and the pixel P3.

According to another embodiment, since the pixels P0 and P1 are respectively included in the X+ face and the Y− face, the X+ face and the Y− face being faces different from each other, the processor 520 may transform a coordinate (P0.$s_{face}$, P0.$t_{face}$) of the pixel P0 on the cube map and a coordinate (P1.$s_{face}$, P1.$t_{face}$) of the pixel P1 on the cube map based on the coordinate transformation tables 910 and 920. Specifically, the processor 520 may determine a reference pixel as the pixel P0, and since "Face of Reference" and "Face of adjusted pixel" of the pixel P0 are identically the X+ face, maintain the transformed coordinate (P0.$s_{adj}$, P0.$t_{adj}$) of the pixel P0 as the original coordinate (P0.$s_{face}$, P0.$t_{face}$) by using the coordinate transformation tables 910 and 920. Next, since "Face of Reference" of the pixel P1 is the X+ face and "Face of adjusted pixel" of the pixel P1 is the Y− face, the processor 520 may transform the transformed coordinate (P1.$s_{adj}$, P1.$t_{adj}$) of the pixel P1 to a coordinate (P1.$t_{face}$, 2−P1.$s_{face}$) by using the coordinate correction tables 910 and 920. Likewise, the processor 520 may transform coordinates of the pixel P2 and the pixel P3 on the cube map, the pixel P2 and the pixel P3 projected to a face different from a face of the pixel P0.

Subsequently, the processor 520 may calculate derivatives $$\frac{\partial s_{face}}{\partial x} = P1.s_{adj} - P0.s_{adj} = P1.t_{face} - P0.s_{face} \text{ and } \frac{\partial t_{face}}{\partial x} = P1.t_{adj} - P0.t_{adj} = (2 - P1.s_{face}) - P0.t_{face}$$

of the pixel P0 and the pixel P1 based on a transformed coordinate (P0.$s_{face}$, P0.$t_{face}$) of the pixel P0 and a transformed coordinate (P1.$t_{face}$, 2−P1.$s_{face}$) of the pixel P1. Likewise, the processor 520 may calculate derivatives of the pixel P0 and the pixel P2 and derivatives of the pixel P0 and the pixel P3.

Referring to FIG. 5 again, the processor 520 may determine an LOD for texturing the cube map of the pixels based on the calculated derivatives of the pixels. The LOD may be calculated, for example, by using equation 1 below but is not limited thereto.

$$\lambda = \log_2[\text{MAX}\{\sqrt{(\partial s/\partial x)_{p01}^2 + (\partial t/\partial x)_{p01}^2}, \sqrt{(\partial s/\partial x)_{p02}^2 + (\partial t/\partial x)_{p02}^2}\}] \quad \text{Equation 1}$$

In equation 1, $\lambda$ is a value of an LOD, $(\partial s/\partial x)_{p01}$ is a derivative of the pixels P0 and P1 on the $s_{face}$ coordinate axis, $(\partial t/\partial x)_{p01}$ is a derivative of the pixels P0 and P1 on the $t_{face}$ coordinate axis, $(\partial s/\partial x)_{p02}$ is a derivative of the pixels P0 and P2 on the $s_{face}$ coordinate axis, and $(\partial t/\partial x)_{p02}$ is a derivative of the pixels P0 and P2 on the $t_{face}$ coordinate axis.

Also, according to an embodiment, the processor 520 may include a first operator determining coordinates of adjacent pixels on the cube map, a second operator transforming a coordinate of at least one pixel from among the pixels when the pixels respectively correspond to different faces of the cube map, a third operator calculating derivatives of the pixels on the cube map by using the transformed coordinate; and a fourth operator determining an LOD for texturing the cube map of the pixels based on the calculated derivatives.

Therefore, since the apparatus 500 may directly calculate derivatives of pixels from transformed coordinates of the pixels on the cube map, the number of processing elements required for calculating the derivatives may be reduced. (Here, processing elements refers to either dedicated computational hardware, a dedicated circuit, or a general processor programmed to carry out an operation.) Specifically, to calculate derivatives of pixels, which serve as a premise in determining an LOD, in the related art, there is a requirement for a process of calculating derivatives of the pixels in the screen space and a process of calculating derivatives of the pixels on the cube map by using the derivatives calculated in advance before determining coordinates of the pixels on the cube map. Thus, in the related art, a plurality of processing elements such as multipliers, adders, and dividers are required during these processes. However, according to the present embodiment, since the apparatus 500 needs to perform only an addition operation or an inversion operation on coordinates of pixels on the cube map, the number of processing elements required for calculating derivatives may be reduced and thus the processing cost, computing hardware and/or power consumption of the apparatus 500 may be reduced. For example, in FIG. 9, to calculate derivatives $$\frac{\partial s_{face}}{\partial x} \text{ and } \frac{\partial t_{face}}{\partial x}$$

of two pixels on the $s_{face}$ coordinate axis and the $t_{face}$ coordinate axis, the apparatus 500 requires only an operator for transforming coordinates of the two pixels and an operator for obtaining a difference between the transformed coordinates of the two pixels.

Figure 12:
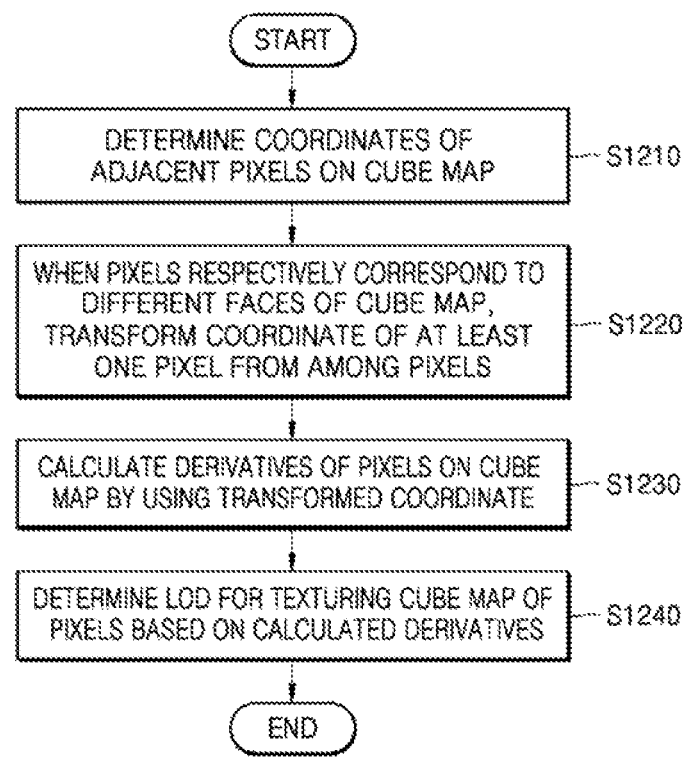
FIG. 12 is a flowchart explaining a method of determining an LOD for texturing a cube map according to an embodiment.

FIG. 12 is a flowchart explaining a method of determining an LOD for texturing a cube map according to an embodiment.

A method illustrated in FIG. 12 may be performed by elements of the apparatus 500 of FIG. 5 and the texture processing unit 130 of FIG. 1, and repeated descriptions are omitted.

In operation S1210, the apparatus 500 may determine coordinates of adjacent pixels on the cube map. In an embodiment, the apparatus 500 may determine a coordinate of a point of a pixel projected to the cube map as a coordinate of the pixel on the cube map based on a directional vector of the pixel in the screen space.

In operation S1220, when pixels respectively correspond to different faces of the cube map, the apparatus 500 may transform a coordinate of at least one pixel from among the pixels.

First, the apparatus 500 may determine whether the pixels respectively correspond to different faces of the cube map. In other words, the apparatus 500 may determine whether the pixels in the screen space are respectively projected to the different faces of the cube map. In an embodiment, the apparatus 500 may determine whether the pixels respectively correspond to the different faces of the cube map based on whether coordinates of the pixels on the cube map determined in advance are respectively included in the different faces of the cube map. Also, in another embodiment, the apparatus 500 may determine whether the pixels respectively correspond to the different faces of the cube map based on directional vectors of the pixels in the screen space.

Next, when adjacent pixels respectively correspond to the different faces of the cube map, the apparatus 500 may transform a coordinate of at least one pixel on the cube map from among the pixels. According to an embodiment, the apparatus 500 may transform a coordinate of another pixel on the cube map from among the pixels based on an origin and a coordinate axis of a face corresponding to a reference pixel from among the pixels. Also, when adjacent pixels respectively correspond to the different faces of the cube map, the apparatus 500 may transform coordinates of pixels on the cube map based on the coordinate transformation table including information about a transformation operation required for the coordinates of the pixels.

For example, the apparatus 500 may transform a coordinate of a pixel by performing at least one of an addition operation and an inversion operation on the coordinate of the pixel. As a specific example, the apparatus 500 may perform an addition operation of +1, −1, or +2 on a pixel and perform an inversion operation of inverting a sign of a pixel. Also, the apparatus 500 may perform an operation of swapping a coordinate axis value of a pixel from ($s_{face}$, $t_{face}$) to ($t_{face}$, $s_{face}$).

In operation S1230, the apparatus 500 may calculate derivatives of pixels on the cube map by using transformed coordinates of the pixels on the cube map. Specifically, the apparatus 500 may calculate distances between pixels on a coordinate axis of the cube map as derivatives of the pixels. For example, the apparatus 500 may calculate distances between pixels respectively on an $s_{face}$ coordinate axis and a $t_{face}$ coordinate axis of the cube map as derivatives of the pixels with respect to the $s_{face}$ coordinate axis and the $t_{face}$ coordinate axis of the cube map. In other words, the apparatus 500 may calculate a difference of coordinates of pixels respectively on the $s_{face}$ coordinate axis and the $t_{face}$ coordinate axis of the cube map.

In operation S1240, the apparatus 500 may determine an LOD for texturing the cube map of pixels based on calculated derivatives of the pixels.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer-readable codes, executable by a processor, on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network coupled computer systems so that the computer-readable code is stored and executed in a distributive manner. This media can be read by the computer, stored in the memory, and executed by the processor.

The inventive concept may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed by one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method of determining a level of detail (LOD) for texturing a cube map, the method comprising:
    determining coordinates of first and second pixels of a screen space, the first and second pixels being mapped to respective first and second cube map pixels of the cube map located at first cube map coordinates and second cube map coordinates, respectively;
    transforming the coordinates of the second cube map pixel when the first and second pixels respectively project to first and second faces of the cube map, and designating the first face as a reference face in which cube map pixel coordinates are defined with an "s" axis component and a "t" axis component, wherein the t axis is orthogonal to the s axis;
    calculating derivatives $(\partial s/\partial x)_{p01}$ and $(\partial t/\partial x)_{p01}$ of the first pixel with respect to the second pixel, by calculating component distances between the first cube map pixel and the second cube map pixel along the s axis and along the t axis, respectively, using the transformed coordinate, wherein "x" denotes a coordinate axis of the screen space and p01 denotes a relationship between the first pixel and the second pixel;
    calculating derivatives $(\partial s/\partial x)_{p02}$ and $(\partial t/\partial x)_{p02}$ of the first pixel with respect to a third pixel of the screen space, wherein p02 denotes a relationship between the first pixel and the third pixel, by calculating component distances between the first cube map pixel and a third cube map pixel to which the third pixel projects, along the s axis and along the t axis, respectively; and
    determining, based on the calculated derivatives, an LOD for texturing the cube map according to:

$$\lambda = \log_2[\mathrm{MAX}\{\sqrt{(\partial s/\partial x)_{p01}^2 + (\partial t/\partial r)_{p01}^2}, \sqrt{(\partial s/\partial x)_{p02}^2 + (\partial t/\partial x)_{p02}^2}\}]$$

where $\lambda$ is a value of the LOD.

2. The method of claim 1, wherein the transforming comprises transforming coordinates of the cube map pixels based on a coordinate transformation table comprising information about a transformation operation required for the coordinates of the cube map pixels.

3. The method of claim 1, wherein the transforming comprises performing least one of an addition operation and an inversion operation on a coordinate of the first or second cube map pixel.

4. The method of claim 1, wherein the cube map is a cubic texture comprising six square faces having a normalized size.

5. The method of claim 1, wherein the transforming comprises determining, based on directional vectors of the first and second pixels in a screen space, whether at least the first and second pixels respectively correspond to the different faces of the cube map.

6. An apparatus for determining a level of detail (LOD) for texturing a cube map, the apparatus comprising:
    memory storing computer-executable instructions; and
    a processor configured to execute the computer-executable instructions to:
        determine coordinates of first and second pixels of a screen space, the first and second pixels being mapped to respective first and second cube map pixels of the cube map located at first cube map coordinates and second cube map coordinates, respectively;
        transform the coordinates of the second cube map pixel when the first and second pixels respectively project to first and second faces of the cube map, and designating the first face as a reference face in which cube map pixel coordinates are defined with an "s" axis component and a "t" axis component, wherein the t axis is orthogonal to the s axis;
        calculate derivatives $(\partial s/\partial x)_{p01}$ and $(\partial t/\partial x)_{p01}$ of the first pixel with respect to the second pixel, by calculating component distances between the first cube map pixel and the second cube map pixel along the s axis and along the t axis, respectively, using the transformed coordinate, wherein "x" denotes a coordinate axis of the screen space and p01 denotes a relationship between the first pixel and the second pixel:
        calculate derivatives $(\partial s/\partial x)_{p02}$ and $(\partial t/\partial x)_{p02}$ of the first pixel with respect to a third pixel of the screen space, wherein p02 denotes a relationship between the first pixel and the third pixel, by calculating component distances between the first cube map pixel and a third cube map pixel to which the third pixel projects, along the s axis and along the t axis, respectively; and
        determine, based on the calculated derivatives, an LOD for texturing the cube map according to:

$$\lambda = \log_2[\mathrm{MAX}\{\sqrt{(\partial s/\partial x)_{p01}^2 + (\partial t/\partial x)_{p01}^2}, \sqrt{(\partial s/\partial x)_{p02}^2 + (\partial t/\partial x)_{p02}^2}\}]$$

where $\lambda$ is a value of the LOD.

7. The apparatus of claim 6, wherein the processor transforms coordinates of the cube map pixels based on a coordinate transformation table comprising information about a transformation operation required for the coordinates of the cube map pixels.

8. The apparatus of claim 6, wherein the processor performs at least one of an addition operation and an inversion operation on the coordinate of the first or second cube man pixel.

9. The apparatus of claim 6, wherein the processor, based on directional vectors of the pixels in a screen space, determines whether the first and second pixels respectively correspond to the different faces of the cube map.

10. The apparatus of claim 6, wherein the processor comprises;
    a first processing element determining the coordinates of the first and second pixels on the cube map;
    a second processing element transforming coordinates of the second cube map pixel;
    a third processing element calculating the derivatives of the pixels on the cube map; and
    a fourth processing element determining the LOD for texturing the cube map.

11. A non-transitory computer-readable recording medium having recorded thereon a program which, when executed by a processor of a graphics processing device, implements a method of determining a level of detail (LOD) for texturing a cube map, wherein the method includes:
    determining coordinates of first and second pixels of a screen space, the first and second pixels being mapped to respective first and second cube map pixels of the cube map located at first cube map coordinates and second cube map coordinates, respectively;

transforming the coordinates of the second cube map pixel when the first and second pixels respectively project to first and second faces of the cube map, and designating the first face as a reference face in which cube map pixel coordinates are defined with an "s" axis component and a "t" axis component, wherein the t axis is orthogonal to the s axis;

calculating derivatives $(\partial s/\partial x)_{p01}$ and $(\partial t/\partial x)_{p01}$ of the first pixel with respect to the second pixel, by calculating component distances between the first cube map pixel and the second cube map pixel along the s axis and along the t axis, respectively, using the transformed coordinate, wherein "x" coordinate axis of the screen space and p01 denotes a relationship between the first pixel and the second pixel:

calculating derivatives $(\partial s/\partial x)_{p02}$ and $(\partial t/\partial x)_{p02}$ of the first pixel with resect to a third pixel of the screen space, wherein p02 denotes a relationship between the first pixel and the third pixel, by calculating component distances between the first cube map pixel and a third cube map pixel to which the third pixel projects, along the s axis and along the t axis, respectively; and determining, based on the calculated derivatives, an LOD for texturing the cube map according to:

$$\lambda = \log_2[\text{MAX}\{\sqrt{(\partial s/\partial x)_{p01}^2 + (\partial t/\partial x)_{p01}^2}, \sqrt{(\partial s/\partial x)_{p02}^2 + (\partial t/\partial x)_{p02}^2}\}]$$

where $\lambda$ is a value of the LOD.

12. The non-transitory computer-readable recording medium of claim 11, wherein the transforming comprises determining, based on directional vectors of the pixels in a screen space, whether at least the first and second pixels respectively correspond to the different faces of the cube map.

* * * * *